US009977888B2

(12) United States Patent
Sarangdhar et al.

(10) Patent No.: US 9,977,888 B2
(45) Date of Patent: May 22, 2018

(54) PRIVACY PROTECTED INPUT-OUTPUT PORT CONTROL

(71) Applicant: Intel Corporation, Santa Clara, CA (US)

(72) Inventors: Nitin V. Sarangdhar, Portland, OR (US); Raul Gutierrez, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 14/978,578

(22) Filed: Dec. 22, 2015

(65) Prior Publication Data

US 2017/0177846 A1 Jun. 22, 2017

(51) Int. Cl.
G06F 21/00 (2013.01)
G06F 21/32 (2013.01)
G06F 21/62 (2013.01)

(52) U.S. Cl.
CPC .............. G06F 21/32 (2013.01); G06F 21/62 (2013.01)

(58) Field of Classification Search
CPC ................................. G06F 21/32; G06F 21/62
See application file for complete search history.

(56) References Cited

U.S. PATENT DOCUMENTS 8,327,441 B2 * 12/2012 Kumar .................... G06F 21/57
726/22
8,433,909 B1 * 4/2013 Sakkos .................. G06Q 40/00
713/170
8,826,005 B1 * 9/2014 Brichford ........... H04L 63/0823
713/156
9,112,854 B1 * 8/2015 Bhimanaik ......... H04L 63/0823
9,680,872 B1 * 6/2017 Roth ....................... H04L 63/20
2002/0159681 A1 * 10/2002 MacDonald ....... H04Q 11/0005
385/17
2003/0028829 A1 * 2/2003 Slater ...................... H04B 1/74
714/47.3
2003/0074567 A1 * 4/2003 Charbonneau ........ G06F 21/565
713/186

(Continued)

FOREIGN PATENT DOCUMENTS

WO WO-2011028785 A2 3/2011

OTHER PUBLICATIONS

"International Application Serial No. PCT/US2016/063336, International Search Report dated Mar. 2, 2017", 3 pgs.

(Continued)

*Primary Examiner* — David Garcia Cervetti
(74) *Attorney, Agent, or Firm* — Schwegman Lundberg & Woessner, P.A.

(57) ABSTRACT

Systems and techniques for privacy protected input-output port control are described herein. In an example, an indication may be obtained that a protected port is disabled. A set of application attributes stored in a secure memory location may be compared to a set of attested application attributes to create a verification flag. At least one port attribute of the protected port may be obtained based on the verification flag. The protected port may be enabled using the at least one port attribute. Other examples, for controlling an input-output port using computer firmware and trusted execution techniques are further disclosed.

22 Claims, 4 Drawing Sheets (56) References Cited

U.S. PATENT DOCUMENTS

| | | | |
|---|---|---|---|
| 2005/0021971 A1* | 1/2005 | Patankar | G06F 21/57 713/176 |
| 2006/0037084 A1* | 2/2006 | Brown | G06F 21/85 726/28 |
| 2007/0168582 A1* | 7/2007 | Huang | G06F 21/82 710/36 |
| 2007/0192652 A1* | 8/2007 | Kao | G06F 11/0709 714/4.2 |
| 2008/0072196 A1* | 3/2008 | Hekmatpour | G06F 17/5022 716/102 |
| 2009/0113210 A1 | 4/2009 | Westerinen et al. | |
| 2009/0183038 A1 | 7/2009 | Andreoletti et al. | |
| 2011/0154501 A1* | 6/2011 | Banginwar | H04L 9/3236 726/26 |
| 2011/0208963 A1* | 8/2011 | Soffer | G06F 3/023 713/168 |
| 2012/0151209 A1* | 6/2012 | Visnyak | H04L 9/3234 713/166 |
| 2012/0260345 A1 | 10/2012 | Quinn et al. | |
| 2012/0303528 A1* | 11/2012 | Weiner | G06Q 20/20 705/44 |
| 2013/0346530 A1* | 12/2013 | Hortig | H04L 12/40032 709/208 |
| 2014/0115659 A1* | 4/2014 | Attfield | G06F 21/51 726/1 |
| 2014/0282906 A1* | 9/2014 | Ignatchenko | H04L 9/3234 726/4 |
| 2014/0282907 A1* | 9/2014 | Ignatchenko | H04L 9/3234 726/4 |
| 2015/0033012 A1* | 1/2015 | Scarlata | H04L 9/3242 713/161 |
| 2015/0347480 A1* | 12/2015 | Smart | G06F 17/30327 707/743 |
| 2015/0355696 A1 | 12/2015 | Pamley et al. | |
| 2016/0147924 A1* | 5/2016 | Verma | G06F 17/5045 716/103 |
| 2016/0203313 A1* | 7/2016 | El-Moussa | G06F 8/65 726/23 |
| 2016/0323106 A1* | 11/2016 | Roper | H04L 9/3247 |
| 2016/0359836 A1* | 12/2016 | Horgan | H04L 63/083 |
| 2017/0093896 A1* | 3/2017 | Poornachandran | H04L 63/1425 |

OTHER PUBLICATIONS

"International Application Serial No. PCT/US2016/063336, Written Opinion dated Mar. 2, 2017", 6 pgs.

* cited by examiner

PRIVACY PROTECTED INPUT-OUTPUT PORT CONTROL

BACKGROUND

Biometric security uses a unique biological element of a user to confirm the user's identity. The unique biological elements may be desirable targets for theft as they may be used to spoof the identity of a user allowing an attacker to gain access to sensitive data. Malware is sometimes used to steal private data such as the unique biological elements. Software may attest that it is not malware or the user may be asked to verify software access to personal data. However, these methods may be subject to circumvention.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Biometric authentication may access user information that the user may consider private. For example, the iris of the user's eye may be used as a biometric identifier. The iris, much like a fingerprint, has a high degree of uniqueness making it a reliable source of identity. The user may wish to keep such personally identifiable information private.

An infrared (IR) image of the user's iris may not be easily available by techniques outside of a user device that captures the user's iris using an IR image. The user may wish to be protected from malware capturing this information without user knowledge. A typical user may not be sophisticated enough to distinguish between a good software stack and malware that mimics a user interface. In an example, An imaging device (e.g., camera, scanner, etc.) may be connected to, for example, a Universal Serial Bus (USB) port and/or a mobile industry processor interface alliance (MIPI) port (e.g., Camera Serial Interface, etc.). Software-based techniques may be used to determine the integrity of the operating system hosting the imaging device. However, the software may not be able to establish its own integrity leaving open the possibility that the software and/or operating system are compromised rendering this approach unreliable. Other existing solutions may include some user interaction where the user may be asked to determine the integrity of the software platform. However, attackers may employ social engineering techniques to trick the user into verifying the integrity of the software platform.

The presently disclosed configurations allow the device to protect the user from malware. In an example, the presently disclosed configurations use a combination of hardware, firmware, and software components that limit user interaction to address these issues by enabling the IR camera only after the software platform has been verified. Original equipment manufacturer (OEM) (e.g., computer manufacturer, integrated circuit manufacturer, etc.) configuration information obtained through computing system firmware (e.g., a basic input-output system (BIOS), unified extensible firmware interface (UEFI), etc.) may be used to describe which input-output port supports a privacy protected imaging device.

The input-output port may be disabled by the computing system firmware during boot to protect the input-output port until the integrity of the software platform may be verified. Once a verified software stack is up and running, software running inside a Trusted Execution Environment (TEE) may use trusted platform module (TPM) measurements to verify the integrity of the software stack. The TEE may communicate with a converged security management engine firmware (CSME FW) using hardware hooks to enable the CSME FW to enable the port. This technique may simplify the manufacturing flow for the OEM to configure the camera port as the OEM may only specify which port is identified for privacy protection. In addition, this technique may prevent attackers from compromising the software stack hosting the imaging device and obtaining the user's private data.

Various approaches to implement the TEE may be used depending on the relevant hardware architecture. For example, ARM®-based processor architectures may implement a TEE using TrustZone® technology features, so that the integrity of the software platform may be verified before an input-output port is enabled thereby securing the input collected from a device connected to the port from attack. Also for example, Intel®-based processor architectures may implement the TEE using Software Guard Extensions (SGX) features such as secure enclaves.

Figure 1:
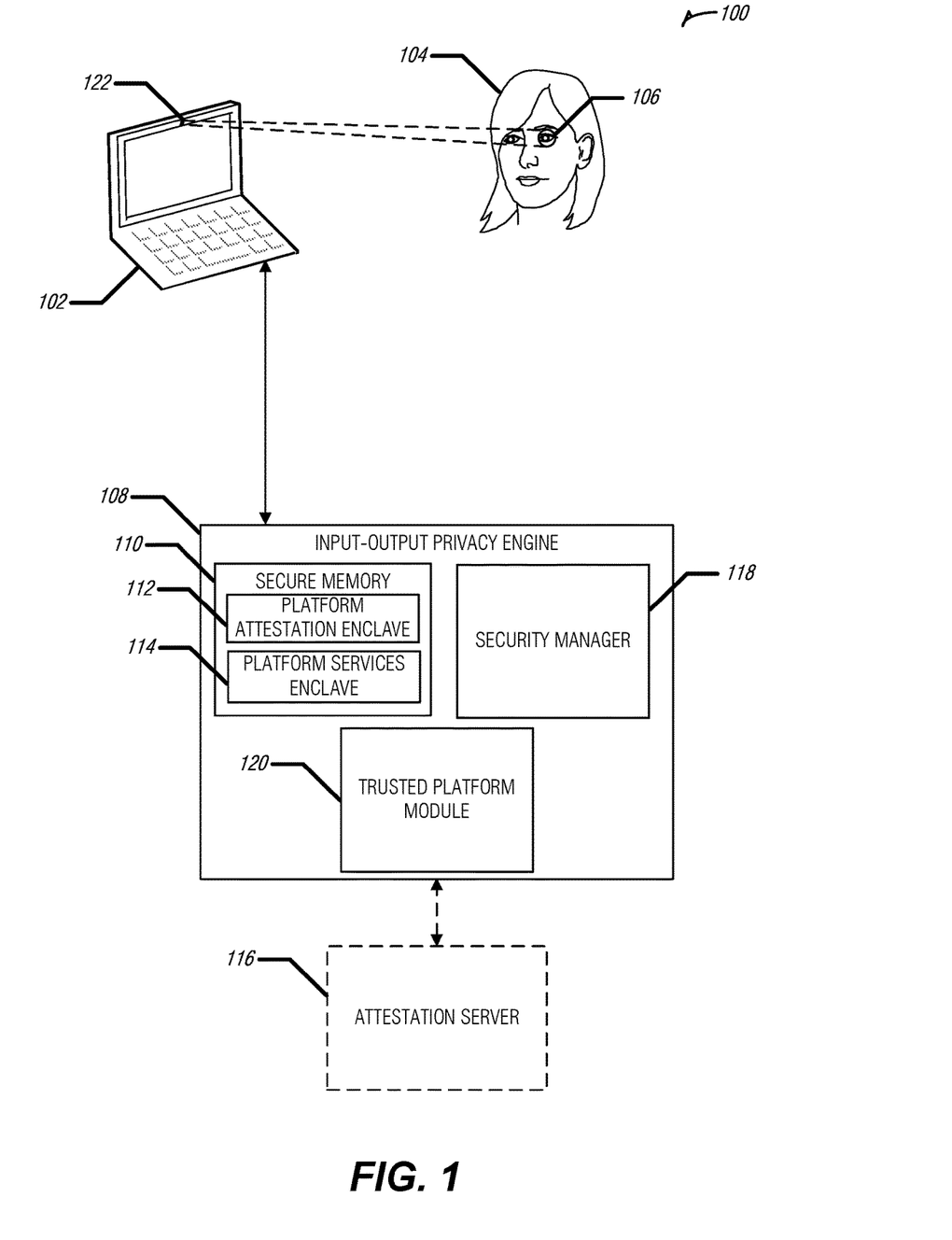
FIG. 1 illustrates an environment including an input-output privacy engine for privacy protected input-output port control, according to an embodiment.

FIG. 1 illustrates an environment 100 including an input-output privacy engine 108 for privacy protected input-output port control, according to an embodiment.

A user 104 may wish to use a biometric identifier (e.g., iris, fingerprint, etc.) to authenticate with a system (e.g., computing device, software application, access control system, etc.). For example, the user 104 may wish to login to device 102 using an image capture from her iris 106. Biometric identifiers may be high risk targets for attackers due to their high level of uniqueness. Attackers may employ various techniques such as, for example, malicious software or social engineering tactics, to obtain biometric identifiers of the user 104 so the identifier can be used to gain unauthorized access to systems on which the user 104 has been granted access.

The threat of these attacks may be reduced by verifying the integrity of the software platform (e.g., operating system, software application, etc.) that controls the processing of a device used to collect biometric identifiers. The threat can be further reduced by performing the verification in a trusted environment that prevents outside access to the verification process. In addition, by limiting interaction of the user, the threat posed by social engineering techniques is reduced.

The environment 100 includes a device (e.g., computing device, mobile device, smartphone, internet of things (IoT) device, etc.) 102 communicatively coupled via a port (e.g., USB, MIPI, etc.) to an imaging device 122 (e.g., camera, scanner, etc.). The imaging device 122 is used to capture the biometric identifier of the user 104, for example, the 106. The device 102 includes an input-output privacy engine 108.

In an example, the port is a hardware device coupled integrated into the device 102.

Figure 2:
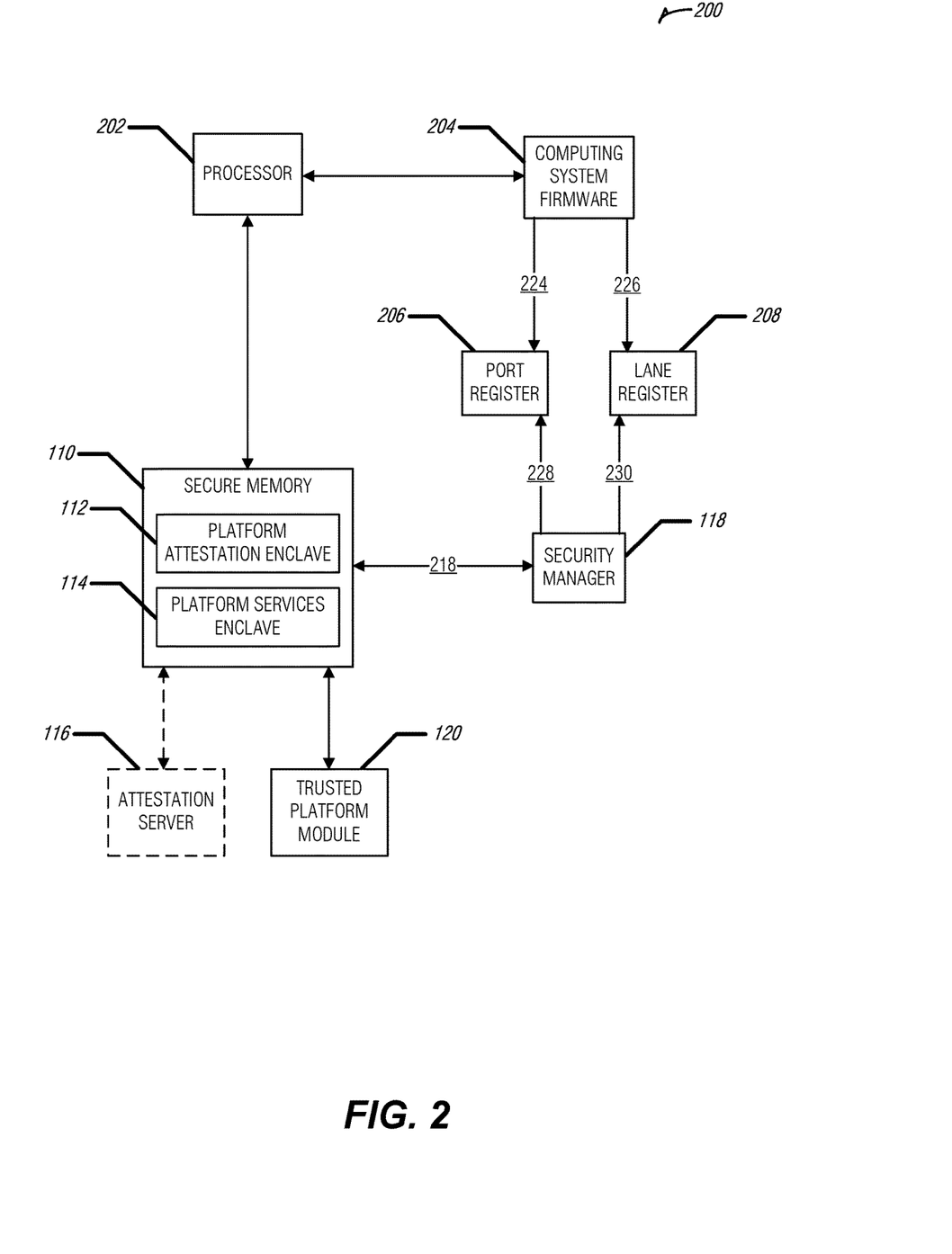
FIG. 2 illustrates an example of a system for privacy protected input-output port control, according to an embodiment.

The input-output privacy engine 108 includes a secure memory 110 providing a trusted execution environment, such as a secure enclave. For example, a secure enclave may be configured as a secure segment of memory enabling protected execution of a set of executable code unsecured access outside the secure memory 110. The secure memory 110 includes a platform attestation enclave 112 that is used for securely executing code for verifying and/or attesting to the integrity of a software platform.

The secure memory 110 also includes a platform service enclave 114 that is used for securely executing code for requesting services (e.g., input-output port activation requests) provided by the software platform. The secure memory 110, platform attestation enclave 112, and platform services enclave 114 are described in more detail in FIG. 2.

The input-output privacy engine 108 includes a security manager 118 that enables and/or disables connectivity on an input-output port of the device 102. The security manager 118 is described in more detail in FIG. 2.

The input-output privacy engine 108 may include a trusted platform module (TPM) 120 that may collect measurements for the platform that may be used to verify and/or attest to the integrity of the software platform. For example, the TPM may collect measurements from a known good (e.g., trusted) copy of the software platform which may then be compared to measurements of the software platform loaded in the platform attestation enclave 112. The TPM 120 is described in more detail in FIG. 2.

The input-output privacy engine 108 may communicate with an external attestation server (e.g., attestation server of a cloud based software attestation service, third party software provider, etc.) 116 that may be used to collect the measurements for the known good copy of the software platform. In an example, periodic updates may be received from the attestation server that may include whether older versions of the software platform have been revoked. The attestation server 116 is described in more detail in FIG. 2.

FIG. 2 illustrates an example of a system 200 for privacy protected input-output port control, according to an embodiment. The system 200 includes components of the input output privacy engine 108 as described in FIG. 1.

The system 200 includes a processor 202 that is communicatively coupled to a computing system firmware 204. In an example, the computing system firmware (e.g., a basic input-output system (BIOS), unified extensible firmware interface (UEFI), etc.) 204 causes the transmission of a port control message 224 to a port register 206 to disable an input-output port (e.g., a Universal Serial Bus (USB) port of an extensible host controller, etc.). In another example, the computing system firmware 204 causes the transmission of a lane control message 226 to a lane register 208 to disable a lane of a channel corresponding to an input-output port (e.g., a lane of a channel corresponding with a Camera Serial Interface port, Serial Peripheral Interface, etc.).

In an example, the OEM may include (e.g., per-program) configuration information in the computing system firmware 204 establishing which port or lane contains a privacy-protected port and a corresponding port control message 224 or lane control message 226 is sent to disable the port and/or lane based on this configuration information. For example, during manufacturing, a smartphone OEM may configure the computing system firmware 204 to identify a camera port for protection and a privacy policy for the camera port. The smartphone OEM may also provide information in the computing system firmware 204 to send the configuration information of the privacy protected camera port.

The configuration information may include information necessary to enable and/or disable a port. For example, an extensible host controller (XHCI) may support a write-once register (e.g., port register 206) that allows it to be written from the computing system firmware 204. This register can be used to enable/disable each individual physical port by writing a 1 or a 0 on the port. Ports may be enabled by default and disabled when a 0 is written by the computing system firmware 204. This allows the computing system firmware 204 to lock the physical port that it would like to privacy protect during power on process. Once locked another reset may be performed to unlock the port.

For example, a MIPI Controller supports "n" lanes which are configured by the computing system firmware 204 in "m" ports. As a result, when a specific port is to be disabled, all the lanes associated with that port would need to be individually disabled. The configuration information in the computing system firmware 204 may include the information from the OEM for lane assignment to individual ports. The new register is written once from the computing system firmware 204 and may include a granularity of "n" bits to allow individual enable/disable of each lane.

The processor 202 is communicatively coupled to secure memory 110 via a secure communication channel. In an example, the communication between the processor 202 and the secure memory 110 is encrypted. In an example, the secure memory and the processor may create a trusted execution environment (TEE) used to run application code and load application data protected from malicious applications. In an example, the processor may encrypt application code and application data directed towards secure memory to be protected from outside access. In an example, the secure memory includes secure memory areas or enclaves. In an example, the application code and the application data may each be loaded in a separate enclave.

The secure memory 110 is communicatively coupled to a trusted platform module (TPM) 120. The TPM 120 may include a crypto-processor that can be used to store measurements of the software loaded on the platform during boot sequence into Platform Configuration Registers (PCRs) embedded inside the TPM. In an example, the TPM 120 may generate a quote of the stored PCR measurements using a hash key provided by the Platform Attestation Enclave (PAE) 112. These measurements may represent a summary of a hardware and software configuration of a computing device. In an example, the PAE 112 may use the PCR measurements to validate the event log generated during the boot sequence. The event log may contain security version number of the software. The PAE 112 may compare the security version number with the security version number of a known good software and hardware combination to verify the integrity of the computing platform. In an example, the PAE 112 may make measurements from the TPM 120. In an example, the PAE 112 may obtain a platform software version and may determine if the platform software version is the same as the latest known good version of the software platform.

In an example, the PAE 112 may obtain TPM 120 platform configurations register (PCR) measurements of the software that boots on the platform. The PAE 112 may compare the known good set of TPM 120 PCR measurements that indicate that the software running on the platform is capable of properly privacy protecting the imaging device 122 from malware resident in RING0 (e.g., execution of operating system kernel) and RING3 (e.g., execution of applications).

In some examples, the system 200 may include an attestation server 116. In an example, the attestation server may be provided by a third-party software provider. In an example, PAE 112 sends a message to the attestation server 116 to determine if the software security version has been revoked. In an example, the message may be sent on a weekly basis. In an example, the PAE may determine the integrity of the software based at least in part on a response received from the attestation server 116.

The trusted execution environment which includes the processor 202 and secure memory 110 may also include a platform services enclave (PSE) 114. The PSE 114 may receive an indication of the integrity of the software platform from the PAE 112. In an example, the PSE 114 may determine the integrity of the software platform using data received from the PAE 112. In an example, The PSE 112 may use information received from other enclaves or external servers to make the determination.

The system 200 includes a security manager 118 that is communicatively coupled with the PSE 114 via a secure communication channel 218. In an example, the secure communication channel may encrypt and or sign the communication between the PSE 114 and the security manager 118. In an example, the security manager is implemented in firmware running on a security co-processor of a computing device.

The security manager 118 may send a port control message 228 to the port register 206 to enable the input-output port and/or sends a lane control message 230 to the lane register 208 to enable the lane of the channel corresponding to the input-output port. Thus, the same register(s), port register 206 and/or lane register 208 used by the computing system firmware 204 to block the port are used by the security manager 118 to unblock the port.

For example, at boot of the device, the computing system firmware 204 may begin execution and disable the port based on the settings provided by the OEM. The computing system firmware 204 may send the information indicating that the port is disabled to the security manager 118 (e.g., using a host embedded controller interface (HECI) message, etc.). After the computing system firmware 204 completes execution, the operating system boots. It is unknown at this point whether the operating system is good or bad (e.g., compromised, malicious, etc.). The PAE 112 starts, makes measurements from the TPM 120, retrieves the operating system security version, validates the running operating system is the same as the latest known good security version, and determines whether the operating system is good or bad.

In an example, the PAE 112 communicates with the PSE 114. The PSE 114 communicates with the security manager 118 which includes a platform services dynamic application loader applet (PSDA). The PSDA communicates with the PSE 114 to read which port should be enabled and to write to the port register 206 and/or the lane register 208 to enable the port. After the device is booted the platform attestation enclave 112 contacts the attestation server 116 periodically (e.g., weekly, etc.) to make sure that the operating system security version is not revoked. The security manager 118 determines if a port should be enabled using the software integrity information returned from PAE 114. In an example, the security manager obtains an indication of the integrity of the software platform from the PSE 114. In an example, the port is enabled based on the indication. In an example, the security manager 118 enables the port when it receives proper health attestation of the software stack running on the platform.

It will be understood that the system 200 may be extended to additional input-output mechanisms in which a user desires privacy. By way of example and not limitation, the system 200 may be used for fingerprint controllers operating on a Serial Peripheral Interface port (SPI), near-field communication (NFC) card readers interfacing with an input-output port, or any other input-output mechanism that the user wishes to operate only if trusted software is running on the platform. In some examples, the user may be provided an option to enable or disable a specific input-output port if the capability has not been provided by the OEM. For example, an application may be provided that to the user that is capable of writing a 0 to the port register of USB port 0 to disable USB port 0 at boot. The security manager 118 may obtain the indication from the software and verify the integrity of the running operating system before enabling the port.

In some examples, an indication is obtained within programming of the computing system to indicate that a protected port is disabled. In an example, the indication that the protected port is disabled is received from a computing system firmware. In an example, the indication that the protected port is disabled is obtained from a host embedded controller interface message. In an example, the protected port is a Universal Serial Bus port. In an example, the protected port is a Camera Serial Interface port. In an example, the protected port is a Serial Peripheral Interface port. For example, an indication in the computing system firmware 204 that USB port 0 is disabled may be received by the security manager 118.

A set of application attributes stored in a secure memory location may be compared to a set of attested application attributes to create a verification flag. In an example, the set of attested application attributes is obtained from a trusted platform module. In an example, the set of attested application attributes is obtained from an attestation server. In an example, the set of application attributes and the set of attested application attributes may include an application security version number. In an example, the set of application attributes may include a first signature of a running application and the set of attested application attributes may include a second signature of a known trusted application and the first signature is compared to the second signature to create the verification flag. For example, the TPM 120 may create a hash value of the running operating system and the hash of the running operating system may be compared to a hash of a known good copy of the operating system to determine the integrity of the running operating system.

At least one port attribute of the protected port may be obtained based on the verification flag. In an example, the at least one port attribute may include a port register of the protected port. In an example, the at least one port attribute may include a lane register. For example, the protected port may be USB port 0 with an associated port register.

The protected port may be enabled using the at least one port attribute. In an example, enabling the protected port may include write a value to the port register. In an example, enabling the protected port may include write a value to the lane register. For example, the security manager 118 may write a 1 to the port register of USB port 0 to enable the port.

Figure 3:
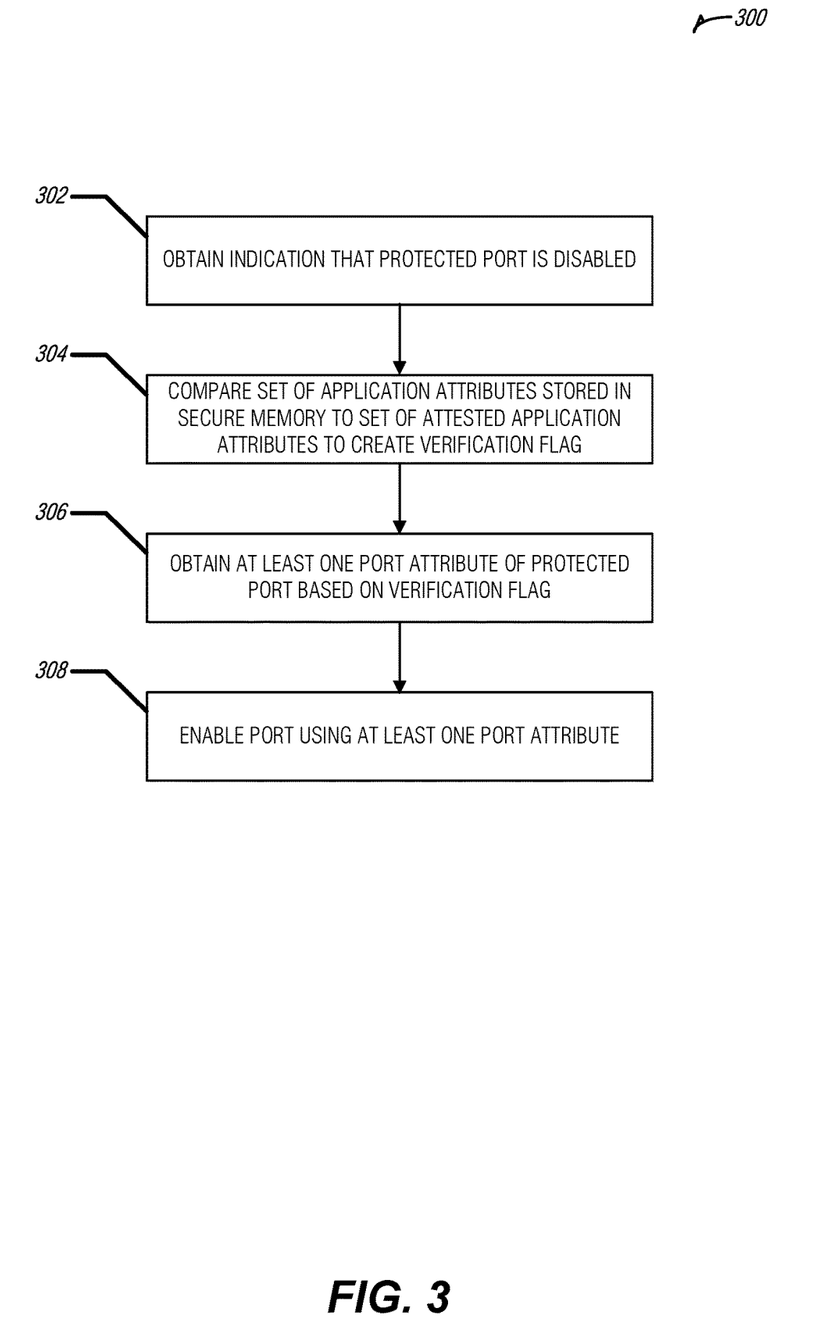
FIG. 3 illustrates an example of a method for privacy protected input-output port control, according to an embodiment.

FIG. 3 illustrates an example of a method 300 for privacy protected input-output port control, according to an embodiment.

At operation 302, method 300 obtains an indication that a protected port is disabled. In an example, the indication that the protected port is disabled is received from a computing system firmware (e.g., a basic input-output system (BIOS), unified extensible firmware interface (UEFI), etc.). In an example, the indication that the protected port is disabled is obtained from a host embedded controller interface message. In an example, the protected port is a Universal Serial Bus port. In an example, the protected port is a Camera Serial Interface port. In an example, the protected port is a Serial Peripheral Interface port.

At operation 304, method 300 compares a set of application attributes stored in a secure memory location to a set of attested application attributes to create a verification flag. In an example, the set of attested application attributes is obtained from a trusted platform module. In an example, the set of attested application attributes is obtained from an attestation server. In an example, the set of application attributes and the set of attested application attributes may include an application version number. In an example, the set of application attributes may include a first signature of a running application and the set of attested application attributes may include a second signature of a known trusted application and the first signature is compared to the second signature to create the verification flag.

At operation 306, method 300 obtains at least one port attribute of the protected port based on the verification flag. In an example, the at least one port attribute may include a port register of the protected port. In an example, the at least one port attribute may include a lane register.

At operation 308, method 300 enables the protected port using the at least one port attribute. In an example, enabling the protected port may include write a value to the port register. In an example, enabling the protected port may include write a value to the lane register.

Figure 4:
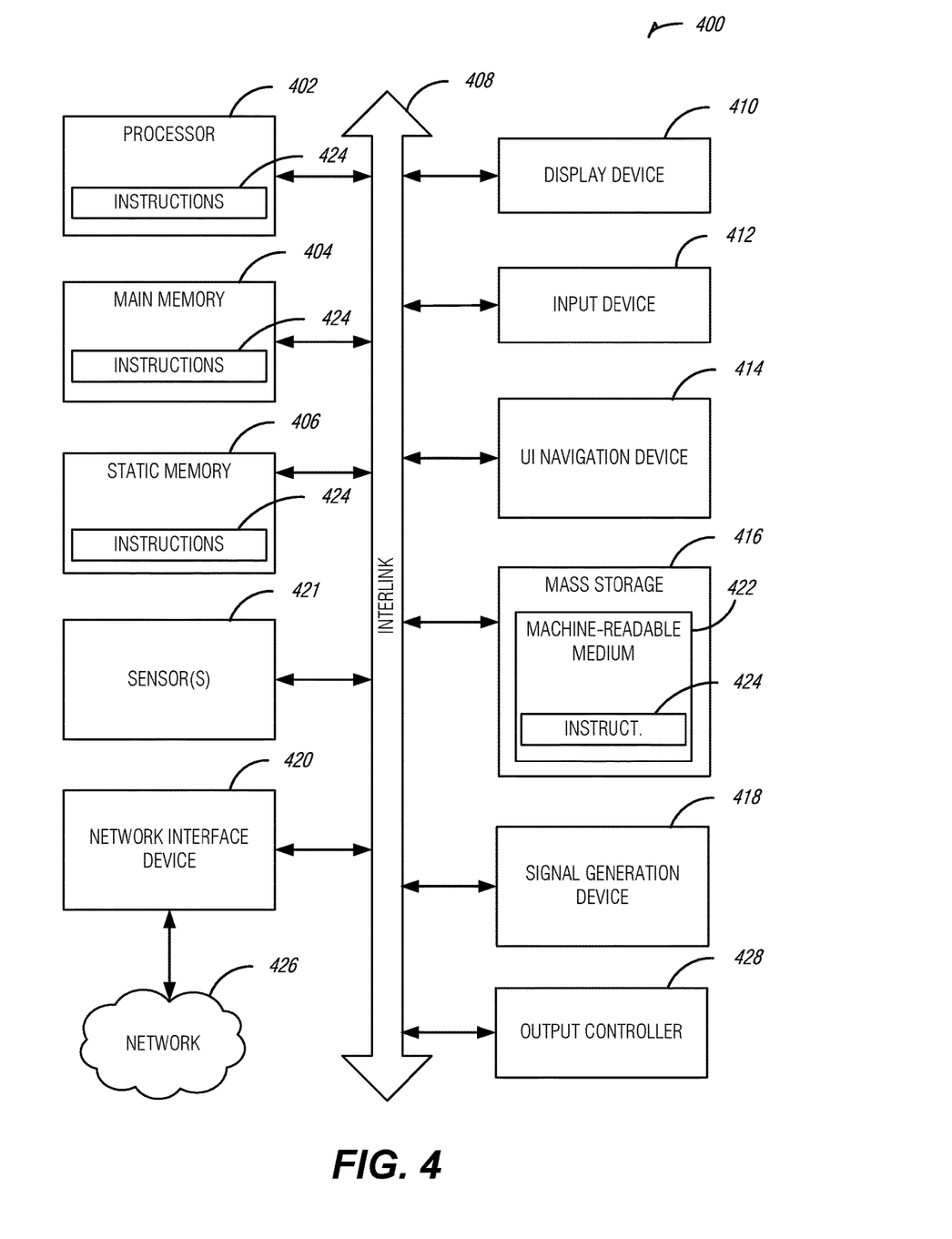
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES & EXAMPLES

Example 1 is a method to implement protected input-output port control, comprising electronic operations, which when performed by circuitry of a computing device, causes the computing device to perform the electronic operations including: obtaining an indication that a protected input-output port is disabled; comparing a set of application attributes stored in a secure memory location to a set of attested application attributes to create a verification flag; obtaining at least one port attribute of the protected input-output port based on the verification flag; and enabling the protected input-output port using the at least one port attribute.

In Example 2, the subject matter of Example 1 optionally includes, wherein the indication that the protected input-output port is disabled is received from a computing system firmware.

In Example 3, the subject matter of any one or more of Examples 1-2 optionally include, wherein the indication that the protected input-output port is disabled is obtained from a host embedded controller interface message.

In Example 4, the subject matter of any one or more of Examples 1-3 optionally include, wherein the set of attested application attributes is obtained from a trusted platform module.

In Example 5, the subject matter of any one or more of Examples 1-4 optionally include, wherein the set of attested application attributes is obtained from an attestation server.

In Example 6, the subject matter of any one or more of Examples 1-5 optionally include, wherein the set of application attributes and the set of attested application attributes includes an application version number.

In Example 7, the subject matter of any one or more of Examples 1-6 optionally include, wherein the set of application attributes includes a first signature of a running application and the set of attested application attributes includes a second signature of a known trusted application, and wherein the first signature is compared to the second signature to create the verification flag.

In Example 8, the subject matter of any one or more of Examples 1-7 optionally include, wherein the at least one port attribute includes a port register of the protected input-output port.

In Example 9, the subject matter of Example 8 optionally includes, wherein enabling the protected input-output port includes writing a value to the port register.

In Example 10, the subject matter of any one or more of Examples 1-9 optionally include, wherein the at least one port attribute includes a lane register of the protected input-output port.

In Example 11, the subject matter of Example 10 optionally includes, wherein enabling the protected input-output port includes writing a value to the lane register.

In Example 12, the subject matter of any one or more of Examples 1-11 optionally include, wherein the protected input-output port is a Universal Serial Bus port.

In Example 13, the subject matter of any one or more of Examples 1-12 optionally include, wherein the protected input-output port is a Camera Serial Interface port.

In Example 14, the subject matter of any one or more of Examples 1-13 optionally include, wherein the protected input-output port is a Serial Peripheral Interface port.

Example 15 is a system to implement protected input-output port control, the system comprising means to perform any method of Examples 1-14.

Example 16 is a machine readable medium to implement protected input-output port control, the machine readable medium including instructions that, when executed by a machine, cause the machine to perform any method of Examples 1-14.

Example 17 is a computing apparatus to implement protected input-output port control, the computing apparatus comprising: a processor; a memory; a protected input-output port; and a security management component operably coupled to the processor and memory, the security management component configured to: obtain an indication that the protected input-output port is disabled; compare a set of application attributes stored in a secure memory location of the memory to a set of attested application attributes to create a verification flag; obtain at least one port attribute of the protected input-output port based on the verification flag; and enable the protected input-output port using the at least one port attribute.

In Example 18, the subject matter of Example 17 optionally includes, wherein the indication that the protected input-output port is disabled is received from a computing system firmware.

In Example 19, the subject matter of any one or more of Examples 17-18 optionally include, wherein the indication that the protected input-output port is disabled is obtained from a host embedded controller interface message.

In Example 20, the subject matter of any one or more of Examples 17-19 optionally include, wherein the set of attested application attributes is obtained from a trusted platform module.

In Example 21, the subject matter of any one or more of Examples 17-20 optionally include, wherein the set of attested application attributes is obtained from an attestation server.

In Example 22, the subject matter of any one or more of Examples 17-21 optionally include, wherein the set of application attributes and the set of attested application attributes includes an application version number.

In Example 23, the subject matter of any one or more of Examples 17-22 optionally include, wherein the set of application attributes includes a first signature of a running application and the set of attested application attributes includes a second signature of a known trusted application, and wherein the first signature is compared to the second signature to create the verification flag.

In Example 24, the subject matter of any one or more of Examples 17-23 optionally include, wherein the at least one port attribute includes a port register of the protected input-output port.

In Example 25, the subject matter of Example 24 optionally includes, the security management component further to write a value to the port register.

In Example 26, the subject matter of any one or more of Examples 17-25 optionally include, wherein the at least one port attribute includes a lane register.

In Example 27, the subject matter of Example 26 optionally includes, the security management component further to write a value to the port register write a value to the lane register.

In Example 28, the subject matter of any one or more of Examples 17-27 optionally include, wherein the protected input-output port is a Universal Serial Bus port.

In Example 29, the subject matter of any one or more of Examples 17-28 optionally include, wherein the protected input-output port is a Camera Serial Interface port.

In Example 30, the subject matter of any one or more of Examples 17-29 optionally include, wherein the protected input-output port is a Serial Peripheral Interface port.

In Example 31, the subject matter of any one or more of Examples 17-30 optionally include, further comprising a device connected via the protected input-output port.

Example 32 is a non-transitory computer-readable storage medium to implement protected input-output port control, the computer-readable storage medium including instructions that when executed by a computer, cause the computer to: obtain an indication that a protected input-output port is disabled; compare a set of application attributes stored in a secure memory location to a set of attested application attributes to create a verification flag; obtain at least one port attribute of the protected input-output port based on the verification flag; and enable the protected input-output port using the at least one port attribute.

In Example 33, the subject matter of Example 32 optionally includes, wherein the indication that the protected input-output port is disabled is received from a computing system firmware.

In Example 34, the subject matter of any one or more of Examples 32-33 optionally include, wherein the indication that the protected input-output port is disabled is obtained from a host embedded controller interface message.

In Example 35, the subject matter of any one or more of Examples 32-34 optionally include, wherein the set of attested application attributes is obtained from a trusted platform module.

In Example 36, the subject matter of any one or more of Examples 32-35 optionally include, wherein the set of attested application attributes is obtained from an attestation server.

In Example 37, the subject matter of any one or more of Examples 32-36 optionally include, wherein the set of application attributes and the set of attested application attributes includes an application version number.

In Example 38, the subject matter of any one or more of Examples 32-37 optionally include, wherein the set of application attributes includes a first signature of a running application and the set of attested application attributes includes a second signature of a known trusted application, and wherein the first signature is compared to the second signature to create the verification flag.

In Example 39, the subject matter of any one or more of Examples 32-38 optionally include, wherein the at least one port attribute includes a port register of the protected input-output port.

In Example 40, the subject matter of Example 39 optionally includes, wherein the instructions to enable the protected input-output port include instructions to write a value to the port register.

In Example 41, the subject matter of any one or more of Examples 32-40 optionally include, wherein the at least one port attribute includes a lane register of the protected input-output port.

In Example 42, the subject matter of Example 41 optionally includes, wherein the instructions to enable the protected input-output port include instructions to write a value to the lane register.

In Example 43, the subject matter of any one or more of Examples 32-42 optionally include, wherein the protected input-output port is a Universal Serial Bus port.

In Example 44, the subject matter of any one or more of Examples 32-43 optionally include, wherein the protected input-output port is a Camera Serial Interface port.

In Example 45, the subject matter of any one or more of Examples 32-44 optionally include, wherein the protected input-output port is a Serial Peripheral Interface port.

Example 46 is a system to implement protected input-output port control, the system comprising: means for obtaining an indication that a protected input-output port is disabled; means for comparing a set of application attributes stored in a secure memory location to a set of attested application attributes to create a verification flag; means for obtaining at least one port attribute of the protected input-output port based on the verification flag; and means for enabling the protected input-output port using the at least one port attribute.

In Example 47, the subject matter of Example 46 optionally includes, further comprising: means for receiving the indication that the protected input-output port is disabled is received from a basic input output system.

In Example 48, the subject matter of any one or more of Examples 46-47 optionally include, further comprising: means for obtaining from a host embedded controller interface message the indication that the protected input-output port is disabled.

In Example 49, the subject matter of any one or more of Examples 46-48 optionally include, further comprising:

means for obtaining from a trusted platform module the set of attested application attributes.

In Example 50, the subject matter of any one or more of Examples 46-49 optionally include, further comprising: means for obtaining from an attestation server the set of attested application attributes.

In Example 51, the subject matter of any one or more of Examples 46-50 optionally include, wherein the set of application attributes and the set of attested application attributes includes an application version number.

In Example 52, the subject matter of any one or more of Examples 46-51 optionally include, wherein the set of application attributes includes a first signature of a running application and the set of attested application attributes includes a second signature of a known trusted application, and wherein the first signature is compared to the second signature to create the verification flag.

In Example 53, the subject matter of any one or more of Examples 46-52 optionally include, wherein the at least one port attribute includes a port register of the protected input-output port.

In Example 54, the subject matter of Example 53 optionally includes, wherein the means for enabling the protected input-output port includes means for writing a value to the port register.

In Example 55, the subject matter of any one or more of Examples 46-54 optionally include, wherein the at least one port attribute includes a lane register of the protected input-output port.

In Example 56, the subject matter of Example 55 optionally includes, wherein the means for enabling the protected input-output port includes means for writing a value to the lane register.

In Example 57, the subject matter of any one or more of Examples 46-56 optionally include, wherein the protected input-output port is a Universal Serial Bus port.

In Example 58, the subject matter of any one or more of Examples 46-57 optionally include, wherein the protected input-output port is a Camera Serial Interface port.

In Example 59, the subject matter of any one or more of Examples 46-58 optionally include, wherein the protected input-output port is a Serial Peripheral Interface port.

In Example 60, the subject matter of any one or more of Examples 46-59 optionally include, further comprising a device connected via the protected input-output port.

What is claimed is:

1. A computing apparatus to implement protected input-output port control, the computing apparatus comprising:
    a processor;
    a memory;
    a protected input-output port, wherein the protected input-output port hosts a biometric imaging device; and
    a security management component operably coupled to the processor and memory, the security management component configured to:
    obtain an indication that the protected input-output port is disabled;
    compare a set of application attributes stored in a secure memory location of the memory to a set of attested application attributes to create a verification flag, wherein the set of application attributes includes a first signature of a running application and the set of attested application attributes includes a second signature of a known trusted application, and wherein verification flag provides an indication of a successful comparison of the first signature to the second signature;
    obtain at least one port attribute of the protected input-output port based on the verification flag; and
    enable the protected input-output port using the at least one port attribute.

2. The computing apparatus of claim 1, wherein the indication that the protected input-output port is disabled is received from a computing system firmware.

3. The computing apparatus of claim 1, wherein the indication that the protected input-output port is disabled is obtained from a host embedded controller interface message.

4. The computing apparatus of claim 1, wherein the set of attested application attributes is obtained from a trusted platform module microcontroller.

5. The computing apparatus of claim 1, wherein the set of attested application attributes is obtained from an attestation server.

6. The computing apparatus of claim 1, wherein the at least one port attribute includes a port register of the protected input-output port.

7. The computing apparatus of claim 1, wherein the at least one port attribute includes a lane register.

8. The computing apparatus of claim 1, further comprising a device connected via the protected input-output port.

9. A non-transitory computer-readable storage medium to implement protected input-output port control, the computer-readable storage medium including instructions that when executed by a computer, cause the computer to:
    obtain an indication that a protected input-output port is disabled, wherein the protected input-output port hosts a biometric imaging device;
    compare a set of application attributes stored in a secure memory location to a set of attested application attributes to create a verification flag, wherein the set of application attributes includes a first signature of a running application and the set of attested application attributes includes a second signature of a known trusted application. and wherein verification flag provides an indication of a successful comparison of the first signature to the second signature;
    obtain at least one port attribute of the protected input-output port based on the verification flag; and
    enable the protected input-output port using the at least one port attribute.

10. The computer-readable storage medium of claim 9, wherein the indication that the protected input-output port is disabled is received from a computing system firmware.

11. The computer-readable storage medium of claim 9, wherein the indication that the protected input-output port is disabled is obtained from a host embedded controller interface message.

12. The computer-readable storage medium of claim 9, wherein the set of attested application attributes is obtained from a trusted platform module microcontroller.

13. The computer-readable storage medium of claim 9, wherein the set of attested application attributes is obtained from an attestation server.

14. The computer-readable storage medium of claim 9, wherein the at least one port attribute includes a port register of the protected input-output port.

15. The computer-readable storage medium of claim 9, wherein the at least one port attribute includes a lane register of the protected input-output port.

16. A method to implement protected input-output port control, comprising electronic operations, which when performed by circuitry of a computing device, causes the computing device to perform the electronic operations including:
  obtaining an indication that a protected input-output port is disabled, wherein the protected input-output port hosts a biometric imaging device;
  comparing a set of application attributes stored in a secure memory location to a set of attested application attributes to create a verification flag, wherein the set of application attributes includes a first signature of a running application and the set of attested application attributes includes a second signature of a known trusted application, and wherein verification flag provides an indication of a successful comparison of the first signature to the second signature;
  obtaining at least one port attribute of the protected input-output port based on the verification flag; and
  enabling the protected input-output port using the at least one port attribute.

17. The method of claim 16, wherein the indication that e protected input-output port is disabled is received from a computing system firmware.

18. The method of claim 16, wherein the indication that the protected input-output port is disabled is obtained from a host embedded controller interface message.

19. The method of claim 16, wherein he set of attested application attributes is obtained from a trusted platform module microcontroller.

20. The method of claim 16, wherein the set of attested application attributes is obtained from an attestation server.

21. The method of claim 16, wherein the at least one port attribute includes a port register of the protected input-output port.

22. The method of claim 16, wherein the at least one port attribute includes a lane register of the protected input-output port.

* * * * *

UNITED STATES PATENT AND TRADEMARK OFFICE
CERTIFICATE OF CORRECTION

PATENT NO. : 9,977,888 B2  
APPLICATION NO. : 14/978578  
DATED : May 22, 2018  
INVENTOR(S) : Sarangdhar et al.

Page 1 of 1

It is certified that error appears in the above-identified patent and that said Letters Patent is hereby corrected as shown below:

In Column 14, Line 40, in Claim 9, delete "application." and insert --application,-- therefor     In Column 16, Line 2, in Claim 17, delete "e" and insert --the-- therefor     In Column 16, Line 7, in Claim 19, delete "he" and insert --the-- therefor Signed and Sealed this  
First Day of October, 2019

Andrei Iancu  
*Director of the United States Patent and Trademark Office*